United States Patent
Witting (10) Patent No.: US 9,296,412 B2
(45) Date of Patent: Mar. 29, 2016

(54) STEERING YOKE ASSEMBLY

(71) Applicant: Nicholas Witting, Clark, NJ (US)

(72) Inventor: Nicholas Witting, Clark, NJ (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 29 days.

(21) Appl. No.: 14/039,813

(22) Filed: Sep. 27, 2013

(65) Prior Publication Data

US 2014/0090495 A1    Apr. 3, 2014

Related U.S. Application Data (60) Provisional application No. 61/708,003, filed on Sep. 30, 2012.

(51) Int. Cl.
*F16H 55/28*    (2006.01)
*B62D 3/12*    (2006.01)
*B62D 3/04*    (2006.01)

(52) U.S. Cl.
CPC .. *B62D 3/04* (2013.01); *B62D 3/12* (2013.01); *B62D 3/123* (2013.01); *F16H 55/283* (2013.01); *Y10T 74/18568* (2015.01)

(58) Field of Classification Search
CPC .................................. B62D 3/12; B62D 3/123
See application file for complete search history.

(56) References Cited

U.S. PATENT DOCUMENTS

| | | | |
|---|---|---|---|
| 3,623,379 A * | 11/1971 | Bradshaw et al. | ............... 74/498 |
| 4,271,716 A | 6/1981 | Carduner | |
| 4,322,986 A * | 4/1982 | Adams | ................... B62D 3/123 |
| | | | 74/422 |
| 4,448,088 A * | 5/1984 | Adams | ................... B62D 3/123 |
| | | | 74/422 |
| 4,651,585 A * | 3/1987 | Donn et al. | ...................... 74/422 |
| 4,709,593 A * | 12/1987 | Takeuchi | ............... B62D 3/123 |
| | | | 74/498 |
| 4,936,157 A | 6/1990 | Kotake et al. | |
| 4,939,947 A | 7/1990 | Toyoshima et al. | |
| 5,117,705 A * | 6/1992 | Guasch | ........................... 74/422 |
| 5,265,691 A | 11/1993 | Konishi et al. | |
| 5,622,085 A | 4/1997 | Kostrzewa | |
| 5,802,919 A * | 9/1998 | Phillips | ........................... 74/422 |
| 6,119,540 A | 9/2000 | Phillips | |
| 6,178,843 B1 | 1/2001 | Machida et al. | |

(Continued)

FOREIGN PATENT DOCUMENTS

| | | |
|---|---|---|
| JP | H0635858 Y2 | 9/1994 |
| KR | 20040001378 A | 1/2004 |
| WO | 2009155514 A1 | 12/2009 |

OTHER PUBLICATIONS

International Search Report for PCT/US2013/062276, mailed Jan. 28, 2014, 1 page.

*Primary Examiner* — Barry Gooden, Jr.
(74) *Attorney, Agent, or Firm* — Chi Suk Kim; Abel Law Group, LLP (57) ABSTRACT

A steering yolk bearing assembly includes a body. The body can include a first end having a flat surface and a second end opposite the first end. The second end can have a concave surface having a radius of curvature, $R_{CS}$, a first lateral side and a second lateral side opposite the first lateral side. A first bearing pad can extend from the first lateral side of the concave surface and a second bearing pad can extend from the second lateral side of the concave surface opposite the first bearing pad. Each bearing pad can include a shaft contact surface having a radius of curvature, $R_{SCS}$, and $R_{SCS} \geq 2 \times R_{CS}$.

20 Claims, 8 Drawing Sheets

(56) References Cited

U.S. PATENT DOCUMENTS

| | | | |
|---|---|---|---|
| 6,408,708 B1* | 6/2002 | Sahr | 74/422 |
| 7,487,984 B1 | 2/2009 | Lemont, Jr. et al. | |
| 2002/0084136 A1* | 7/2002 | Fowlkes et al. | 180/428 |
| 2002/0124670 A1* | 9/2002 | Bugosh | 74/388 PS |
| 2002/0152825 A1* | 10/2002 | Adams | B62D 3/123 74/422 |
| 2005/0039560 A1 | 2/2005 | Degorce et al. | |
| 2005/0041895 A1 | 2/2005 | Pionnier et al. | |
| 2005/0061575 A1* | 3/2005 | Abe et al. | 180/444 |
| 2005/0072258 A1* | 4/2005 | Klais et al. | 74/422 |
| 2006/0108759 A1* | 5/2006 | Nishiko | 280/93.514 |
| 2006/0113738 A1* | 6/2006 | Zernickel et al. | 280/93.514 |
| 2006/0185460 A1* | 8/2006 | Shiino et al. | 74/422 |
| 2009/0120226 A1* | 5/2009 | Nishikubo | 74/422 |
| 2009/0174164 A1* | 7/2009 | Kaida et al. | 280/93.514 |
| 2009/0317025 A1 | 12/2009 | Witting et al. | |
| 2010/0251839 A1* | 10/2010 | Kim et al. | 74/29 |
| 2010/0278467 A1* | 11/2010 | Hirose et al. | 384/283 |
| 2011/0148064 A1* | 6/2011 | Yanase et al. | 280/93.514 |
| 2011/0175311 A1* | 7/2011 | Tanaka et al. | 280/93.514 |
| 2013/0152719 A1* | 6/2013 | Meller | F16H 57/023 74/395 |

* cited by examiner

STEERING YOKE ASSEMBLY

CROSS-REFERENCE TO RELATED APPLICATION

This application claims priority under 35 U.S.C. §119(e) to U.S. Patent Application No. 61/708,003 entitled "Steering Yoke Assembly," by Witting, filed Sep. 30, 2012, which is assigned to the current assignee hereof and incorporated herein by reference in its entirety.

BACKGROUND

1. Field of the Disclosure

The present disclosure is directed to bearing and bearing assemblies, particularly the present disclosure is directed to a steering yoke assembly.

2. Description of the Related Art

Many vehicles use a rack and pinion steering system to translate motion from the steering wheel to the turning wheels on the road. In a typical rack and pinion steering system, a steering wheel can be mechanically coupled to a pinion gear via steering shaft. The pinion gear can include gear teeth that are mated with teeth on a rack shaft. As the pinion gear rotates, the rotational motion can be translated into linear motion at the rack shaft. The rack shaft can be connected to a tie rod at each wheel assembly. As the rack shaft moves linearly, the tie rods can rotate in order to rotate the wheel assemblies and turn the vehicle.

To assure proper lash between the pinion and the rack shaft a steering yoke assembly can be used to provide a biasing force that forces the shaft into the pinion gear. The yoke may also be referred to as a "yoke assembly," "yoke slipper," or "puck." The rack shaft (typically steel) slides along the yoke when the pinion gear is rotated. Proper fit between the steering yoke and the rack shaft is essential to any rack and pinion steering system.

Accordingly, the industry continues to need improvements in bearings and bearing assemblies, particularly to steering yoke assemblies.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to bearing assemblies, and particularly, to steering yoke assemblies that can be used to provide a biasing force on a rack shaft in order to maintain a proper lash, or connection, between a pinion gear and the rack shaft. In one aspect, a steering yoke assembly can include a yoke body comprising a first material and a pair of bearing pads affixed to an arcuate, or curved, surface, such as a concave surface, that is configured to fit at least partially around an outer wall of a generally cylindrical shaft. The bearing pads can be made from another material such as a low friction material and can extend from the arcuate surface of the yoke assembly in order provide limited contact between the steering yoke assembly and the rack shaft.

In another aspect, the arcuate surface can be formed with a pair of bearing pad pockets and each bearing pad pocket can be configured to receive a bearing pad. For example, a bearing pad can be press-fitted, glued, or otherwise installed and affixed, within each bearing pad pocket. Alternatively, the body of the steering yoke assembly can be molded around the bearing pads in order to form an interlocking arrangement between the body of the steering yoke assembly and the bearing pads.

The body of the steering yoke assembly can be made from metal, polymer, or a combination thereof. The metal can be a single metal such as aluminum or a metal alloy such as steel, aluminum alloy, brass, etc. The polymer can be a thermoplastic polymer. The thermoplastic polymer can be a polyamide thermoplastic, such as polycaprolactam (aka, polyamide 6 or PA6). Further, the thermoplastic polymer can be polyoxymethylene (POM). Additionally, the thermoplastic polymer can be a polyethylene thermoplastic such as high-density polyethylene (HDPE).

The bearing pads can be made from a low friction polymer. The low friction polymer can include a thermoset polymer or a thermoplastic polymer. The thermoset polymer can include a thermoset polyimide. The thermoset polyimide can include an unfilled thermoset polyimide or a filled thermoset polyimide. The filled thermoset polyimide can include a 15% (by weight) graphite filled thermoset polyimide, a 15% (by weight) graphite/10% (by weight) PTFE filled thermoset polyimide, a 40% (by weight), graphite filled thermoset polyimide, a 15% (by weight) molybdenum disulfide filled thermoset polyimide, or a combination thereof. The thermoplastic polymer can include a thermoplastic polyimide. Further, the polymer can include a porous polyimide or a non-porous polyimide. The porous polyimide can be impregnated with one or more lubricants such as an oil or other lubricant.

Figure 1:
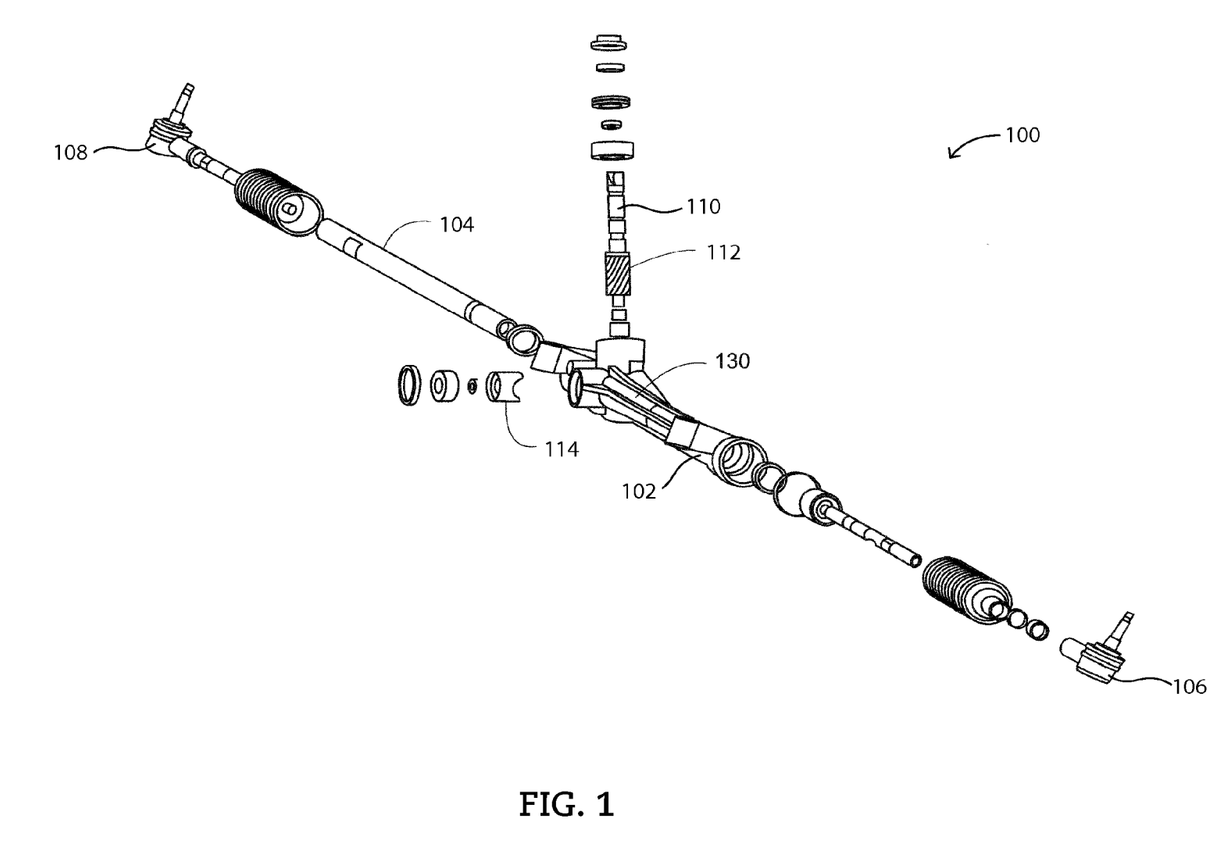
FIG. 1 includes an exploded perspective view of a rack and pinion steering system in accordance with an embodiment.

Referring initially to FIG. 1, a rack and pinion steering system is illustrated and is generally designated 100. As depicted in FIG. 1, the rack and pinion steering system can include a housing 102. A rack shaft 104 can extend through the housing 102 and the rack shaft 104 can be connected to a first tie rod 106 and a second tie rod 108. A shaft 110 that includes a helical pinion gear 112 can extend into the housing 102 generally perpendicular to the rack shaft 104. A steering yoke assembly 114 can be installed within the housing 102 in order to provide a biasing force for maintaining the rack shaft 104 in engagement with the pinion gear 112.

Figure 2:
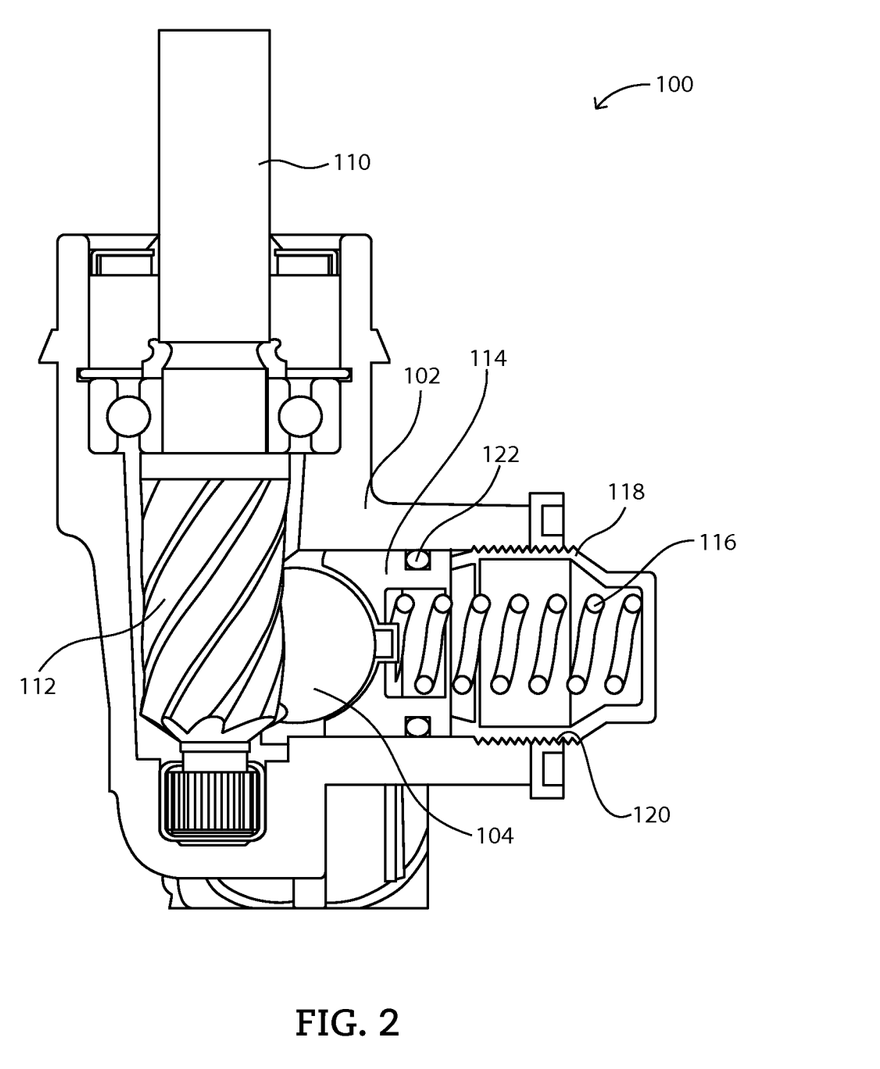
FIG. 2 includes a partial cut-away view of a rack and pinion steering system in accordance with an embodiment.

Specifically, as shown in FIG. 2, the helical pinion gear 110 can be mated with the rack shaft 112. The steering yoke assembly 114 can at wrap at least partially around the outer sidewall of the rack shaft 112 and the steering yoke assembly 114 can be biased toward the outer sidewall of the rack shaft 112 by a spring 116 until the bearing pads of the steering yoke assembly 114 are in contact with the outer sidewall of the rack shaft 112.

The spring 116 can be compressed against the steering yoke assembly 114 by a threaded cap 118 that is threadably engaged with a partially threaded bore 120 formed in the housing 102. FIG. 2 further indicates that an O-ring 122 can be seated in a groove that is formed in a sidewall of the steering yoke assembly 114 and circumscribes the steering yoke assembly 114. In another aspect, the O-ring can be seated in a groove (not shown) formed in the wall of the partially threaded bore 120 in a location that circumscribes the steering yoke assembly 114.

When an operator of the vehicle in which the rack and pinion steering system 100 turns a steering wheel of the vehicle, the shaft 110 rotates causing the pinion gear 112 to rotate therewith. As the pinion gear 112 rotates, the rack shaft 104 can slide either in or out of the page as illustrated in FIG. 2. The rack shaft 104 can slide against the stationary steering yoke assembly 114 which maintains a biasing force that keeps the pinion gear 112 and the rack shaft 104 meshed together.

Figure 3:
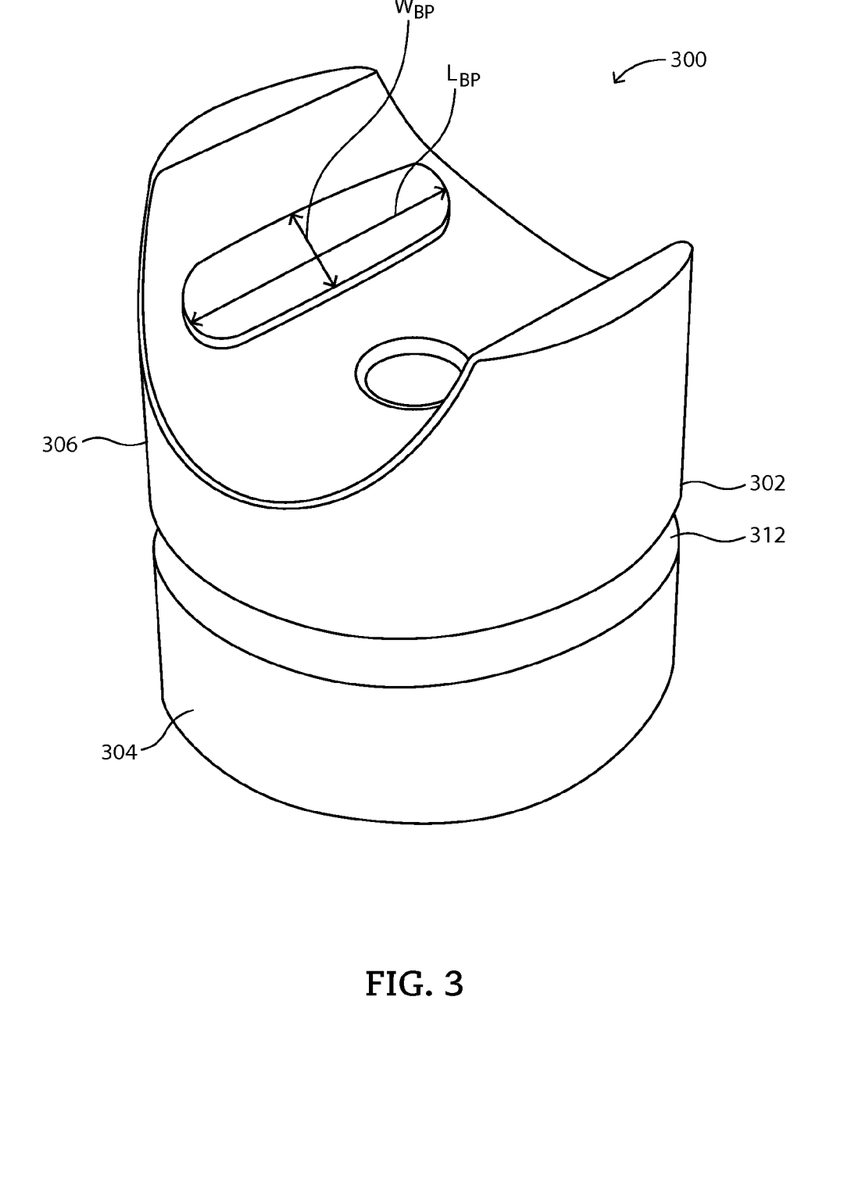
FIG. 3 includes a perspective view of a steering yoke assembly in accordance with an embodiment.
Figure 4:
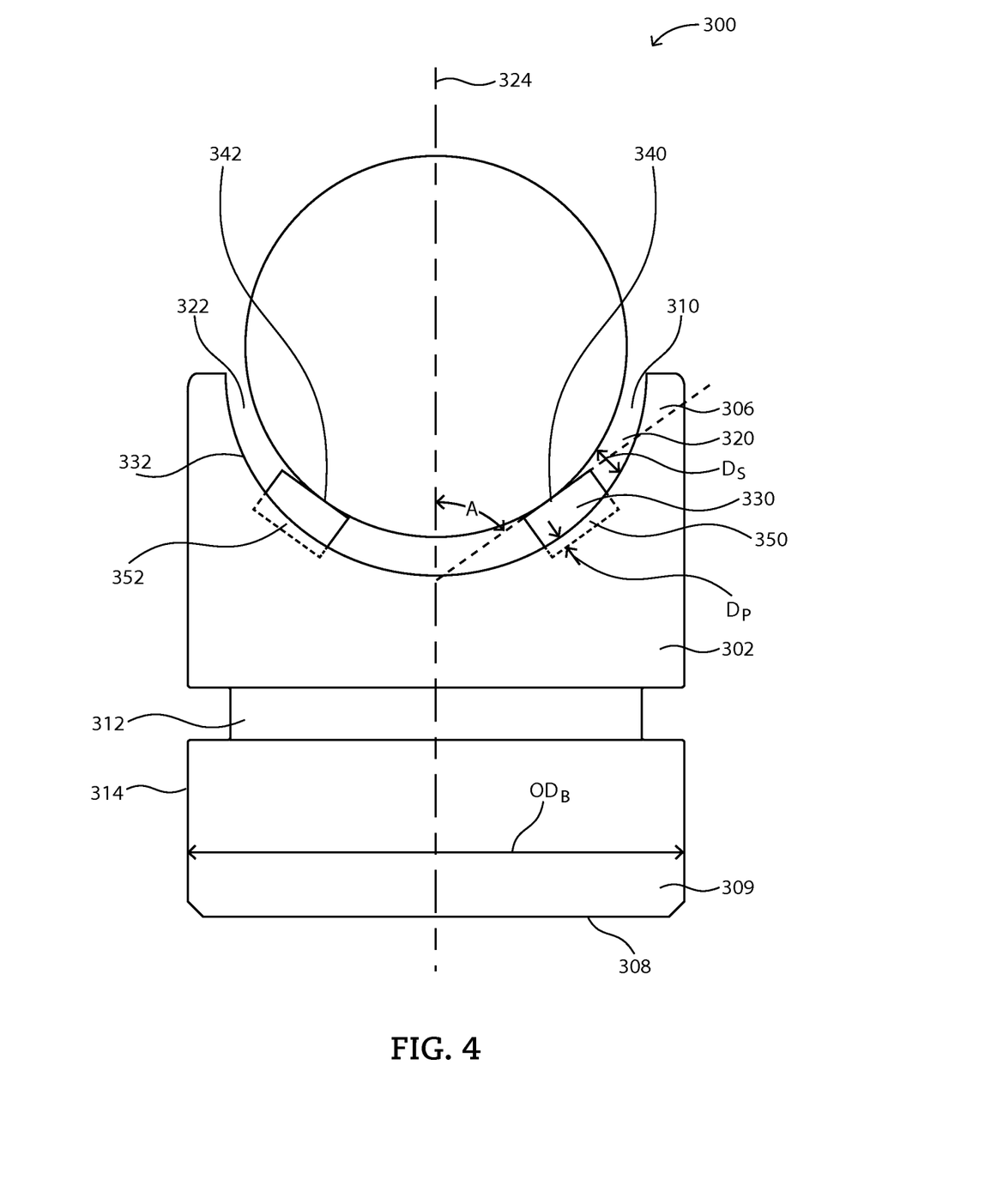
FIG. 4 includes a plan view of a steering yoke assembly in accordance with an embodiment.

FIG. 3 and FIG. 4 illustrate a steering yoke assembly 300 that can be used in conjunction with the rack and pinion steering system 100, described above. As depicted in FIG. 3 and FIG. 4, the steering yoke assembly 300 can include a generally cylindrical body 302 having a first end 304 and a second end 306. The first end 304 of the body 302 can include a generally flat surface 308. The second end 306 of the body 302 can include an arcuate surface. In particular, the arcuate surface can be a concave surface 310. The concave surface 310 can include a radius of curvature, $R_{CS}$.

As illustrated in FIG. 3 and FIG. 4, the body 302 can include an O-ring groove 312 formed in an outer sidewall 314 of the body 302. The O-ring groove 312 can be continuous and can fully circumscribe the body 302 at a substantially uniform depth into the body 302 and a substantially uniform height around the body 302. FIG. 3 and FIG. 4 further indicate that the body 302 can include an outer diameter, $OD_B$.

In a particular aspect, the concave surface 310 can have a first lateral side 320 and a second lateral side 322 opposite the first lateral side 320. The lateral sides 320, 322 can be substantially identical and can be mirror opposites of each other about a central axis 324. A first bearing pad 330 can extend from first lateral side 320 of the concave surface 310 of the body 302. A second bearing pad 332 can extend from the second lateral side 322 of the concave surface 310 of the body 302.

Each bearing pad can include a length, $L_{BP}$, and a width, $W_{BP}$. $L_{BP}$ can be $\geq 60\%$ $OD_B$, such as $\geq 65\%$ $OD_B$, $\geq 70\%$ $OD_B$, $\geq 75\%$ $OD_B$, or $\geq 80\%$ $OD_B$. Further, $L_{BP} \leq 100\%$ $OD_B$, such as $\leq 95\%$ $OD_B$, or $\leq 90\%$ $OD_B$. It can be appreciated that $L_{BP}$ can be within a range between and including any of the % $OD_B$ values described herein.

For example, $L_{BP}$ can be $\geq 60\%$ $OD_B$ and $\leq 100\%$ $OD_B$, such as $\geq 60\%$ $OD_B$ and $\leq 95\%$ $OD_B$, or $\geq 60\%$ $OD_B$ and $\leq 90\%$ $OD_B$. $L_{BP}$ can be $\geq 65\%$ $OD_B$ and $\leq 100\%$ $OD_B$, such as $\geq 65\%$ $OD_B$ and $\leq 95\%$ $OD_B$, or $\geq 65\%$ $OD_B$ and $\leq 90\%$ $OD_B$. $L_{BP}$ can be $\geq 70\%$ $OD_B$ and $\leq 100\%$ $OD_B$, such as $\geq 70\%$ $OD_B$ and $\leq 95\%$ $OD_B$, or $\geq 70\%$ $OD_B$ and $\leq 90\%$ $OD_B$. $L_{BP}$ can be $\geq 75\%$ $OD_B$ and $\leq 100\%$ $OD_B$, such as $\geq 75\%$ $OD_B$ and $\leq 95\%$ $OD_B$, or $\geq 75\%$ $OD_B$ and $\leq 90\%$ $OD_B$. Further, $L_{BP}$ can be $\geq 80\%$ $OD_B$ and $\leq 100\%$ $OD_B$, such as $\geq 80\%$ $OD_B$ and $\leq 95\%$ $OD_B$, or $\geq 80\%$ $OD_B$ and $\leq 90\%$ $OD_B$.

In a particular aspect, $W_{BP}$ can be $\leq 25\%$ $OD_B$, such as $\leq 20\%$ $OD_B$, or $\leq 15\%$. Moreover, $W_{BP}$ can be $\geq 5\%$ $OD_B$, such as $\geq 10\%$, or $\geq 12.5\%$. It can be appreciated that $W_{BP}$ can be within a range between and including any of the 25% $OD_B$ values described herein.

For example, $W_{BP}$ can be $\leq 25\%$ $OD_B$ and $\geq 5\%$ $OD_B$, such as $\leq 25\%$ $OD_B$ and $\geq 10\%$ $OD_B$, or $\leq 25\%$ $OD_B$ and $\geq 12.5\%$ $OD_B$. $W_{BP}$ can be $\leq 20\%$ $OD_B$ and $\geq 5\%$ $OD_B$, such as $\leq 20\%$ $OD_B$ and $\geq 10\%$ $OD_B$, or $\leq 20\%$ $OD_B$ and $\geq 12.5\%$ $OD_B$. $W_{BP}$ can be $\leq 15\%$ $OD_B$ and $\geq 5\%$ $OD_B$, such as $\leq 15\%$ $OD_B$ and $\geq 10\%$ $OD_B$, or $\leq 15\%$ $OD_B$ and $\geq 12.5\%$ $OD_B$.

In another aspect, each bearing pad 330, 332 can include an overall height, $H_{BP}$, and $H_{BP}$ can be $\leq 75\%$ $W_{BP}$, such as $\leq 70\%$ $W_{BP}$, $\leq 65\%$ $W_{BP}$, $\leq 60\%$ $W_{BP}$, $\leq 55\%$ $W_{BP}$, or $\leq 50\%$ $W_{BP}$. $H_{BP}$ can be $\geq 10\%$ $W_{BP}$, such as $\geq 15\%$ $W_{BP}$, $\geq 20\%$ $W_{BP}$, or $\geq 25\%$ $W_{BP}$. It can be appreciated that $H_{BP}$ can be within a range between and including any of the % $W_{BP}$ values described herein.

For example, $H_{BP}$ can be $\leq 75\%$ $W_{BP}$ and $\geq 10\%$ $W_{BP}$, such as $\leq 75\%$ $W_{BP}$ and $\geq 15\%$ $W_{BP}$, $\leq 75\%$ $W_{BP}$ and $\geq 20\%$ $W_{BP}$, or $\leq 75\%$ $W_{BP}$ and $\geq 25\%$ $W_{BP}$. $H_{BP}$ can be $\leq 70\%$ $W_{BP}$ and $\geq 10\%$ $W_{BP}$, such as $\leq 70\%$ $W_{BP}$ and $\geq 15\%$ $W_{BP}$, $\leq 70\%$ $W_{BP}$ and $\geq 20\%$ $W_{BP}$, or $\leq 05\%$ $W_{BP}$ and $\geq 25\%$ $W_{BP}$. $H_{BP}$ can be $\leq 65\%$ $W_{BP}$ and $\geq 10\%$ $W_{BP}$, such as $\leq 65\%$ $W_{BP}$ and $\geq 15\%$ $W_{BP}$, $\leq 65\%$ $W_{BP}$ and $\geq 20\%$ $W_{BP}$, or $\leq 65\%$ $W_{BP}$ and $\geq 25\%$ $W_{BP}$. $H_{BP}$ can be $\leq 60\%$ $W_{BP}$ and $\geq 10\%$ $W_{BP}$, such as $\leq 60\%$ $W_{BP}$ and $\geq 15\%$ $W_{BP}$, $\leq 60\%$ $W_{BP}$ and $\geq 20\%$ $W_{BP}$, or $\leq 60\%$ $W_{BP}$ and $\geq 25\%$ $W_{BP}$. $H_{BP}$ can be $\leq 55\%$ $W_{BP}$ and $\geq 10\%$ $W_{BP}$, such as $\leq 55\%$ $W_{BP}$ and $\geq 15\%$ $W_{BP}$, $\leq 55\%$ $W_{BP}$ and $\geq 20\%$ $W_{BP}$, or $\leq 55\%$ $W_{BP}$ and $\geq 25\%$ $W_{BP}$. Moreover, $H_{BP}$ can be $\leq 50\%$ $W_{BP}$ and $\geq 10\%$ $W_{BP}$, such as $\leq 50\%$ $W_{BP}$ and $\geq 15\%$ $W_{BP}$, $\leq 50\%$ $W_{BP}$ and $\geq 20\%$ $W_{BP}$, or $\leq 50\%$ $W_{BP}$ and $\geq 25\%$ $W_{BP}$.

As illustrated in FIG. 3 and FIG. 4, each bearing pad 330, 332 can include a shaft contact surface 340, 342. In particular bearing pad 330, 332 can include a single, continuous shaft contact surface 340, 342. Each shaft contact surface 340, 342 can include a radius of curvature, $R_{SCS}$, and $R_{SCS}$ can be $\geq 2 \times R_{CS}$, such as $\geq 5 \times R_{CS}$, $\geq 10 \times R_{CS}$, $\geq 50 \times R_{CS}$, $\geq 100 \times R_{CS}$, or $\geq 1000 \times R_{CS}$. Further, $R_{SCS}$ can be $\leq$ infinity. It can be appreciated that $R_{SCS}$ can be within a range between and including any of the values for $R_{SCS}$ values described herein.

For example, $R_{SCS}$ can be $\geq 2 \times R_{CS}$ and $\leq$ infinity, such as $\geq 5 \times R_{CS}$ and $\leq$ infinity, $\geq 10 \times R_{CS}$ and $\leq$ infinity, $\geq 50 \times R_{CS}$ and $\leq$ infinity, $\geq 100 \times R_{CS}$ and $\leq$ infinity, or $\geq 1000 \times R_{CS}$ and $\leq$ infinity.

As $R_{SCS}$ approaches infinity, each shaft contact surface 340, 342 can be considered flat or substantially planar. In this aspect, each shaft contact surface 340, 342 can include a flatness, F. In a particular aspect, F can be $\leq \pm 0.001$ in, such as $\leq \pm 0.00075$ in, $\pm 0.0005$ in, $\pm 0.00025$ in, or $\leq \pm 0.0001$ in. Further, F can be $\geq \pm 0.00001$ in, such as $\geq \pm 0.000025$ in, $\geq \pm 0.00005$ in, or $\geq \pm 0.000075$ in. It can be appreciated that F can be within a range between and including any of the values of F described herein.

For example, F can be $\leq \pm 0.001$ in and $\geq \pm 0.00001$ in, such as $\leq \pm 0.001$ in and $\geq \pm 0.000025$ in, $\leq \pm 0.001$ in and $\geq \pm 0.00005$ in, or $\leq \pm 0.001$ in and $\geq \pm 0.000075$ in. F can be $\leq \pm 0.00075$ in and $\geq \pm 0.00001$ in, such as $\leq \pm 0.00075$ in and $\geq \pm 0.000025$ in, $\leq \pm 0.00075$ in and $\geq \pm 0.00005$ in, or $\leq \pm 0.00075$ in and $\geq \pm 0.000075$ in. F can be $\leq \pm 0.0005$ in and $\geq \pm 0.00001$ in, such as $\leq \pm 0.0005$ in and $\geq \pm 0.000025$ in, $\leq \pm 0.0005$ in and $\geq \pm 0.00005$ in, or $\leq \pm 0.0005$ in and $\geq \pm 0.000075$ in. F can be $\leq \pm 0.00025$ in and $\geq \pm 0.00001$ in, such as $\leq \pm 0.00025$ in and $\geq \pm 0.000025$ in, $\leq \pm 0.00025$ in and $\geq \pm 0.00005$ in, or $\leq \pm 0.00025$ in and $\geq \pm 0.000075$ in. F can be $\leq \pm 0.0001$ in and $\geq \pm 0.00001$ in, such as $\leq \pm 0.0001$ in and $\geq \pm 0.000025$ in, $\leq \pm 0.0001$ in and $\geq \pm 0.00005$ in, or $\leq \pm 0.0001$ in and $\geq \pm 0.000075$ in.

In one aspect, each bearing pad 330, 332 can be surface mounted on the concave surface 320 and the bearing pads 330, 332 can be affixed to the concave surface 320 via a glue, an adhesive, a weld, or some other fastener. In another aspect, affixing the bearing pads 330, 332 can include masking the concave surface 320 to leave an opening in the mask in the shape of the bearing pads 330, 332 and spray coating a material onto the concave surface 320 to form the bearing pads 330, 332. Thereafter, the masking material can be removed to leave the bearing pads 330, 332. The bearing pads 330, 332 can be cured before or after the masking material is removed. In this aspect, each bearing pad 330, 332 can include a body contact surface opposite the shaft contact surface 340, 342. Each body contact surface can be convex and can be curved to match the curvature of the cured surface of the body.

In another aspect, as illustrated in FIG. 4, a first bearing pad pocket 350 can be formed in the first lateral side 320 of the concave surface 310 and a second bearing pad pocket 352 can be formed in the second lateral side 322 of the concave surface 310 opposite the first bearing pad pocket 350. Each bearing pad 330, 332 can be installed in a respective bearing pad pocket 350, 352 such the shaft contact surface 340, 342 of each bearing pad 330, 332 can be spaced a distance, $D_S$, from the concave surface 310 of the body 302 as measured along a long side of each bearing pad 330, 332.

In a particular aspect, $D_S$ can be $\geq 5\% \ H_{BP}$, such as $\geq 7.5\% \ H_{BP}$, $\geq 10\% \ H_{BP}$, $\geq 12.5\% \ H_{BP}$, $\geq 15\% \ H_{BP}$, $\geq 17.5\% \ H_{BP}$, or $\geq 20\% \ H_{BP}$. Further, $D_S$ can be $\leq 50\% \ H_{BP}$, such as $\leq 45\% \ H_{BP}$, $\leq 40\% \ H_{BP}$, $\leq 35\% \ H_{BP}$, or $\leq 30\% \ H_{BP}$. $D_S$ can be within a range between and including any of the $\% \ H_{BP}$ values described herein.

For example, $D_S$ can be $\geq 5\% \ H_{BP}$ and $\leq 50\% \ H_{BP}$, such as $\geq 5\% \ H_{BP}$ and $\leq 45\% \ H_{BP}$, $\geq 5\% \ H_{BP}$ and $\leq 40\% \ H_{BP}$, $\geq 5\% \ H_{BP}$ and $\leq 35\% \ H_{BP}$, or $\geq 5\% \ H_{BP}$ and $\leq 30\% \ H_{BP}$. $D_S$ can be $\geq 7.5\% \ H_{BP}$ and $\leq 50\% \ H_{BP}$, such as $\geq 7.5\% \ H_{BP}$ and $\leq 45\% \ H_{BP}$, $\geq 7.5\% \ H_{BP}$ and $\leq 40\% \ H_{BP}$, $\geq 7.5\% \ H_{BP}$ and $\leq 35\% \ H_{BP}$, or $\geq 7.5\% \ H_{BP}$ and $\leq 30\% \ H_{BP}$. $D_S$ can be $\geq 10\% \ H_{BP}$ and $\leq 50\% \ H_{BP}$, such as $\geq 10\% \ H_{BP}$ and $\leq 45\% \ H_{BP}$, $\geq 10\% \ H_{BP}$ and $\leq 40\% \ H_{BP}$, $\geq 10\% \ H_{BP}$ and $\leq 35\% \ H_{BP}$, or $\geq 10\% \ H_{BP}$ and $\leq 30\% \ H_{BP}$. $D_S$ can be $\geq 12.5\% \ H_{BP}$ and $\leq 50\% \ H_{BP}$, such as $\geq 12.5\% \ H_{BP}$ and $\leq 45\% \ H_{BP}$, $\geq 12.5\% \ H_{BP}$ and $\leq 40\% \ H_{BP}$, $\geq 12.5\% \ H_{BP}$ and $\leq 35\% \ H_{BP}$, or $\geq 12.5\% \ H_{BP}$ and $\leq 30\% \ H_{BP}$. $D_S$ can be $\geq 15\% \ H_{BP}$ and $\leq 50\% \ H_{BP}$, such as $\geq 15\% \ H_{BP}$ and $\leq 45\% \ H_{BP}$, $\geq 15\% \ H_{BP}$ and $\leq 40\% \ H_{BP}$, $\geq 15\% \ H_{BP}$ and $\leq 35\% \ H_{BP}$, or $\geq 15\% \ H_{BP}$ and $\leq 30\% \ H_{BP}$. $D_S$ can be $\geq 17.5\% \ H_{BP}$ and $\leq 50\% \ H_{BP}$, such as $\geq 17.5\% \ H_{BP}$ and $\leq 45\% \ H_{BP}$, $\geq 17.5\% \ H_{BP}$ and $\leq 40\% \ H_{BP}$, $\geq 17.5\% \ H_{BP}$ and $\leq 35\% \ H_{BP}$, or $\geq 17.5\% \ H_{BP}$ and $\leq 30\% \ H_{BP}$. $D_S$ can be $\geq 20\% \ H_{BP}$ and $\leq 50\% \ H_{BP}$, such as $\geq 20\% \ H_{BP}$ and $\leq 45\% \ H_{BP}$, $\geq 20\% \ H_{BP}$ and $\leq 40\% \ H_{BP}$, $\geq 20\% \ H_{BP}$ and $\leq 35\% \ H_{BP}$, or $\geq 20\% \ H_{BP}$ and $\leq 30\% \ H_{BP}$.

Each bearing pad pocket 350, 352 can extend into the concave surface 310 at a pocket depth, $D_P$, measured at the deepest part of the bearing pad pocket 350, 352. $D_P$ can be $\geq 1\% \ H_{BP}$, such as $\geq 2.5\% \ H_{BP}$, $\geq 5\% \ H_{BP}$, $\geq 7.5\% \ H_{BP}$, or $\geq 10\% \ H_{BP}$. Further, $D_P$ can be $\leq 30\% \ H_{BP}$, such as $\leq 25\% \ H_{BP}$, $\leq 20\% \ H_{BP}$, $\leq 15\% \ H_{BP}$, or $\leq 12.5\% \ H_{BP}$. It can be appreciated that $D_P$ can be within a range between and including any of the $\% \ H_{BP}$ values described herein.

For example, $D_P$ can be $\geq 1\% \ H_{BP}$ and $\leq 30\% \ H_{BP}$, such as $\geq 1\% \ H_{BP}$ and $\leq 25\% \ H_{BP}$, $\geq 1\% \ H_{BP}$ and $\leq 20\% \ H_{BP}$, $\geq 1\% \ H_{BP}$ and $\leq 15\% \ H_{BP}$, or $\geq 1\% \ H_{BP}$ and $\leq 12.5\% \ H_{BP}$. $D_P$ can be $\geq 2.5\% \ H_{BP}$ and $\leq 30\% \ H_{BP}$, such as $\geq 2.5\% \ H_{BP}$ and $\leq 25\% \ H_{BP}$, $\geq 2.5\% \ H_{BP}$ and $\leq 20\% \ H_{BP}$, $\geq 2.5\% \ H_{BP}$ and $\leq 15\% \ H_{BP}$, or $\geq 2.5\% \ H_{BP}$ and $\leq 12.5\% \ H_{BP}$. $D_P$ can be $\geq 5\% \ H_{BP}$ and $\leq 30\% \ H_{BP}$, such as $\geq 5\% \ H_{BP}$ and $\leq 25\% \ H_{BP}$, $\geq 5\% \ H_{BP}$ and $\leq 20\% \ H_{BP}$, $\geq 5\% \ H_{BP}$ and $\leq 15\% \ H_{BP}$, or $\geq 5\% \ H_{BP}$ and $\leq 12.5\% \ H_{BP}$. $D_P$ can be $\geq 7.5\% \ H_{BP}$ and $\leq 30\% \ H_{BP}$, such as $\geq 7.5\% \ H_{BP}$ and $\leq 25\% \ H_{BP}$, $\geq 7.5\% \ H_{BP}$ and $\leq 20\% \ H_{BP}$, $\geq 7.5\% \ H_{BP}$ and $\leq 15\% \ H_{BP}$, or $\geq 7.5\% \ H_{BP}$ and $\leq 12.5\% \ H_{BP}$. $D_P$ can be $\geq 10\% \ H_{BP}$ and $\leq 30\% \ H_{BP}$, such as $\geq 10\% \ H_{BP}$ and $\leq 25\% \ H_{BP}$, $\geq 10\% \ H_{BP}$ and $\leq 20\% \ H_{BP}$, $\geq 10\% \ H_{BP}$ and $\leq 15\% \ H_{BP}$, or $\geq 10\% \ H_{BP}$ and $\leq 12.5\% \ H_{BP}$.

As shown in FIG. 4, each shaft contact surface 340, 342 can be angled with respect to the central axis 324 at an angle, A. A is $\geq 5°$, such as $\geq 7.5°$, or $\geq 10°$. In another aspect, A is $\leq 60°$, such as $\leq 55°$, $\leq 50°$, or $\leq 45°$. It can be appreciated that A can be within a range between and including any of the values for A described herein.

For example, A can be $\geq 5°$ and $\leq 60°$, such as $\geq 5°$ and $\leq 55°$, $\geq 5°$ and $\leq 50°$, or $\geq 5°$ and $\leq 45°$. A can be $\geq 7.5°$ and $\leq 60°$, such as $\geq 7.5°$ and $\leq 55°$, $\geq 7.5°$ and $\leq 50°$, or $\geq 7.5°$ and $\leq 45°$. A can be $\geq 10°$ and $\leq 60°$, such as $\geq 10°$ and $\leq 55°$, $\geq 10°$ and $\leq 50°$, or $\geq 10°$ and $\leq 45°$.

Figure 8:
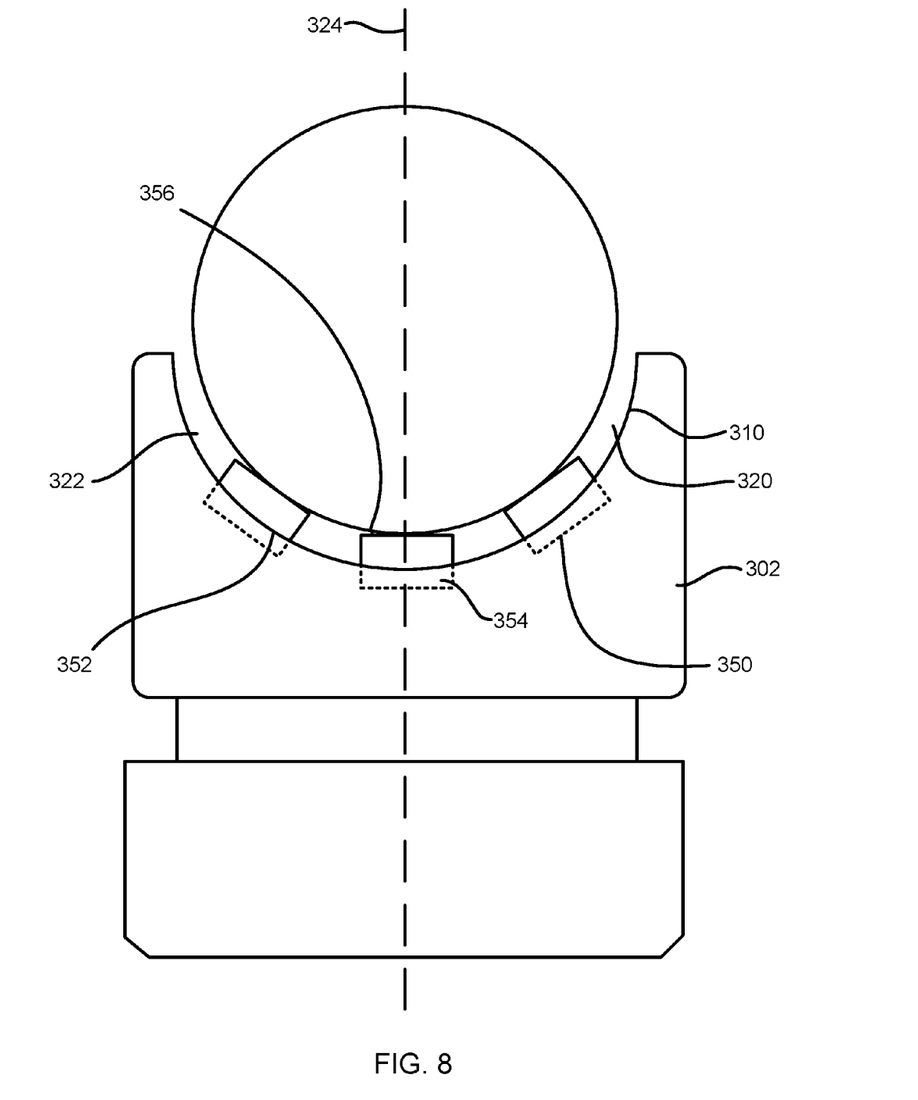
FIG. 8 includes a plan view of a steering yoke assembly in accordance with an embodiment.

Referring to FIG. 8, in another aspect, the steering yoke assembly 300 can include a third bearing pad 354 that can extend from the concave surface 310 of the body 302 along the central axis 324 of the body 302. The third bearing pad 354 can span the first lateral side 320 of the concave surface 310 and the second lateral side 322 of the concave surface 310 so that the third bearing pad 354 is centered on the central axis 324. Further, the third bearing pad 354 and the shaft contact surface 356 of the third bearing pad 354 can be substantially perpendicular to the central axis 324 of the body 302.

Figure 5:
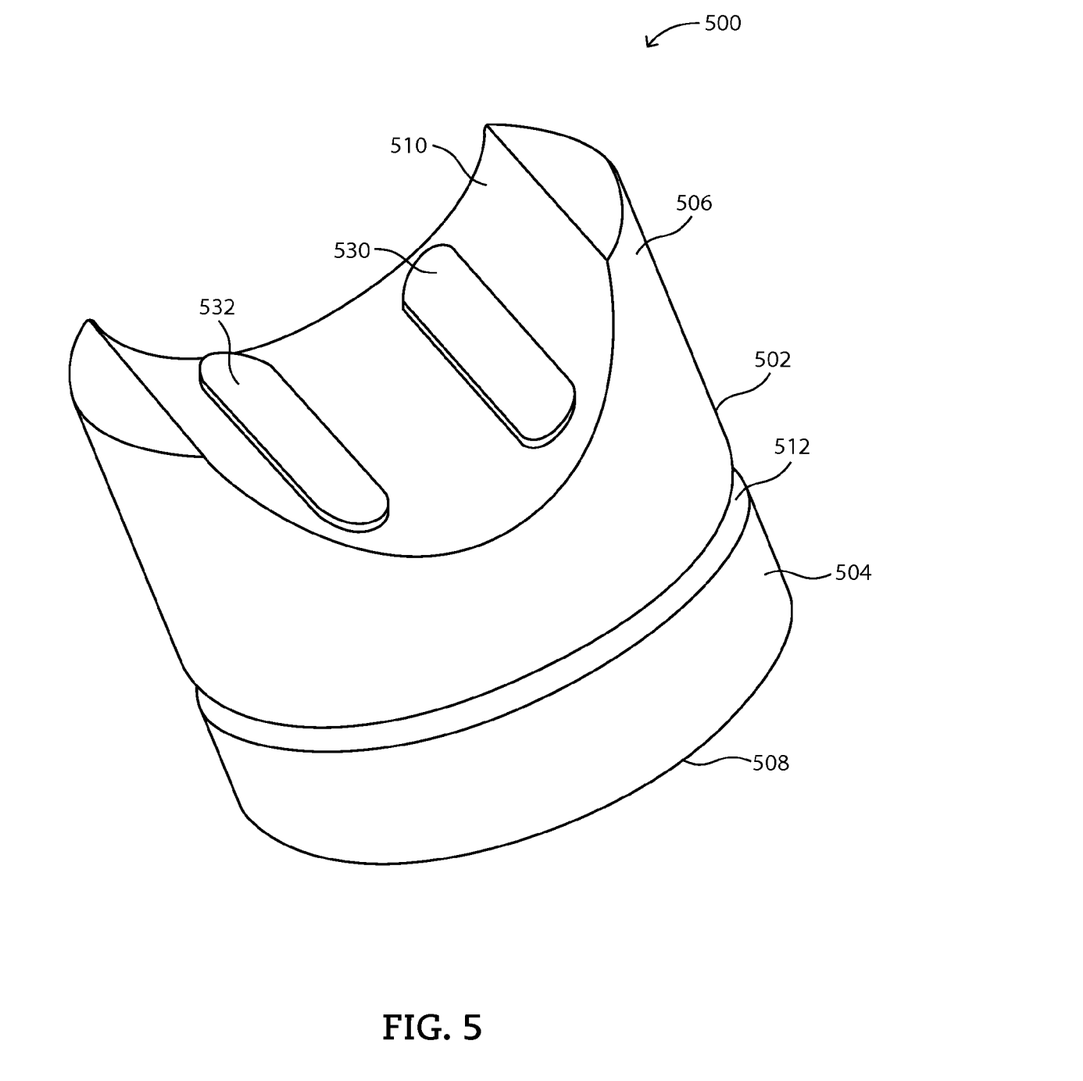
FIG. 5 includes a perspective view of another steering yoke assembly in accordance with an embodiment.
Figure 6:
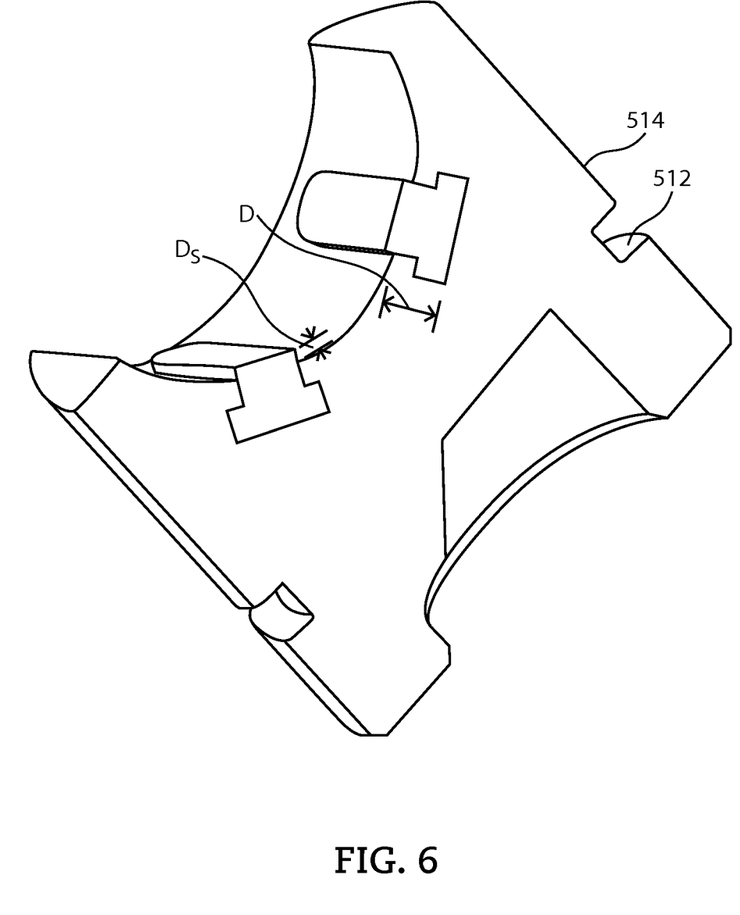
FIG. 6 includes a first cross-sectional view of another steering yoke assembly in accordance with an embodiment.
Figure 7:
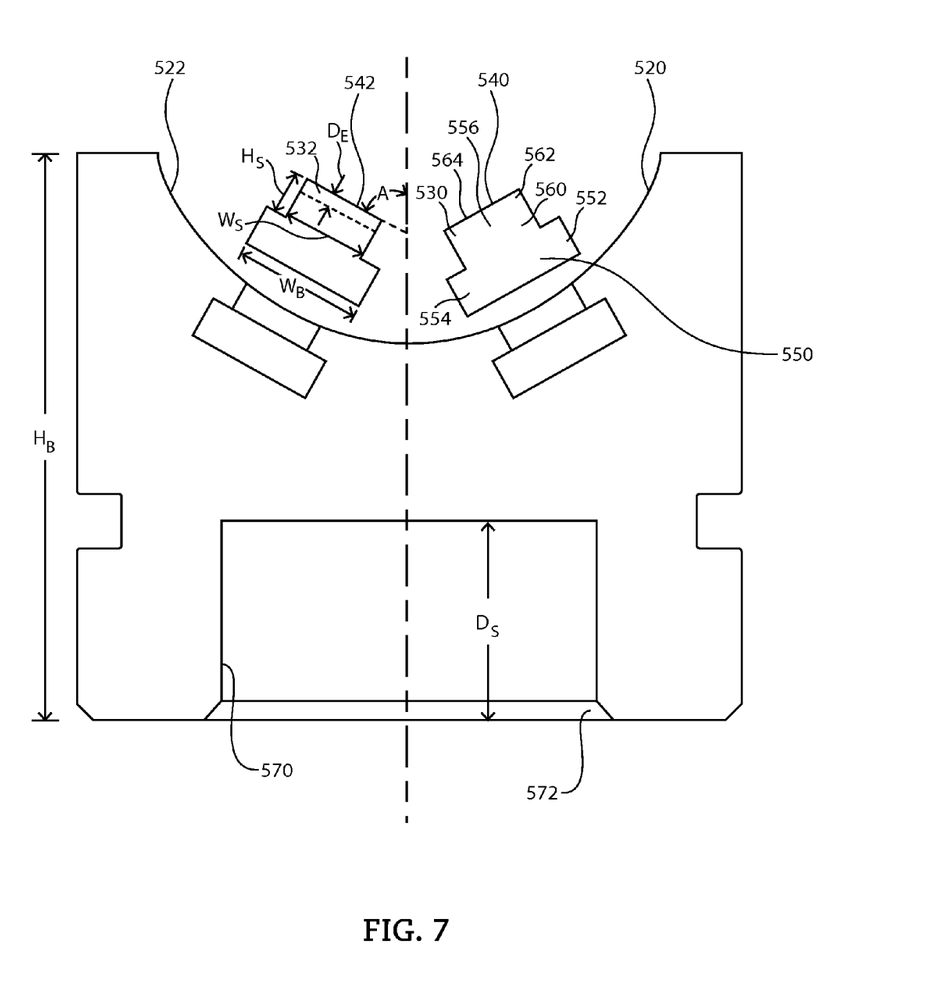
FIG. 7 includes a second cross-sectional view of another steering yoke assembly in accordance with an embodiment.

Referring now to FIG. 5 through FIG. 7, another aspect of a steering yoke assembly that can be installed in the rack and pinion steering system 100 (FIG. 1) is depicted and is generally designated 500. As illustrated, the steering yoke assembly 500 can include a generally cylindrical body 502 having a first end 504 and a second end 506. The first end 504 of the body 502 can include a generally flat surface 508. The second end 506 of the body 502 can include a concave, surface 510. The concave surface 510 can include a radius of curvature, $R_{CS}$.

As illustrated in FIG. 5 through FIG. 7, the body 502 can include an O-ring groove 512 formed in an outer sidewall 514 of the body 502. The O-ring groove 512 can be continuous and can fully circumscribe the body 502 at a substantially uniform depth into the body 502 and a substantially uniform height around the body 502. FIG. 5 and FIG. 4 further indicate that the body 502 can include an outer diameter, $OD_B$.

In a particular aspect, the concave surface 510 can have a first lateral side 520 and a second lateral side 522 opposite the first lateral side 520. The lateral sides 520, 522 can be substantially identical and can be mirror opposites of each other about a central axis 524. A first bearing pad 530 can be embedded into the first lateral side 520 of the concave surface 510 of the body 502. A second bearing pad 532 can be embedded into the second lateral side 522 of the concave surface 510 of the body 502.

In particular, the material comprising the body 502 can be injected molded around the bearing pads 530, 532 to establish an interlocking arrangement between each bearing pad 530, 532 and the body 502. Each bearing pad 530, 532 can be embedded in the concave surface at a depth, D, and $D \geq 1\% \ H_{BP}$, such as $\geq 2.5\% \ H_{BP}$, $\geq 5\% \ H_{BP}$, $\geq 7.5\% \ H_{BP}$, or $\geq 10\% \ H_{BP}$. Moreover, D can be $\leq 30\% \ H_{BP}$, such as $\leq 25\% \ H_{BP}$, $\leq 20\% \ H_{BP}$, $\leq 15\% \ H_{BP}$, or $\leq 12.5\% \ H_{BP}$. It can be appreciated that D can be within a range between and including any of the $\% \ H_{BP}$ values described herein.

For example, D can be $\geq 1\% \ H_{BP}$ and $\leq 30\% \ H_{BP}$, such as $\geq 1\% \ H_{BP}$ and $\leq 25\% \ H_{BP}$, $\geq 1\% \ H_{BP}$ and $\leq 20\% \ H_{BP}$, $\geq 1\% \ H_{BP}$ and $\leq 15\% \ H_{BP}$, or $\geq 1\% \ H_{BP}$ and $\leq 12.5\% \ H_{BP}$. D can be $\geq 2.5\% \ H_{BP}$ and $\leq 30\% \ H_{BP}$, such as $\geq 2.5\% \ H_{BP}$ and $\leq 25\% \ H_{BP}$, $\geq 2.5\% \ H_{BP}$ and $\leq 20\% \ H_{BP}$, $\geq 2.5\% \ H_{BP}$ and $\leq 15\% \ H_{BP}$, or $\geq 2.5\% \ H_{BP}$ and $\leq 12.5\% \ H_{BP}$. D can be $\geq 5\% \ H_{BP}$ and $\leq 30\% \ H_{BP}$, such as $\geq 5\% \ H_{BP}$ and $\leq 25\% \ H_{BP}$, $\geq 5\% \ H_{BP}$ and $\leq 20\% \ H_{BP}$, $\geq 5\% \ H_{BP}$ and $\leq 15\% \ H_{BP}$, or $\geq 5\% \ H_{BP}$ and $\leq 12.5\% \ H_{BP}$. D can be $\geq 7.5\% \ H_{BP}$ and $\leq 30\% \ H_{BP}$, such as $\geq 7.5\% \ H_{BP}$ and $\leq 25\% \ H_{BP}$, $\geq 7.5\% \ H_{BP}$ and $\leq 20\% \ H_{BP}$, $\geq 7.5\% \ H_{BP}$ and $\leq 15\% \ H_{BP}$, or $\geq 7.5\% \ H_{BP}$ and $\leq 12.5\% \ H_{BP}$. D can be $\geq 10\% \ H_{BP}$ and ≤30% $H_{BP}$, such as ≥10% $H_{BP}$ and ≤25% $H_{BP}$, ≥10% $H_{BP}$ and ≤20% $H_{BP}$, ≥10% $H_{BP}$ and ≤15% $H_{BP}$, or ≥10% $H_{BP}$ and ≤12.5% $H_{BP}$.

Each bearing pad can include a length, $L_{BP}$, and a width, $W_{BP}$. $L_{BP}$ can be ≥60% $OD_B$, such as ≥65% $OD_B$, ≥70% $OD_B$, ≥75% $OD_B$, or ≥80% $OD_B$. Further, $L_{BP}$ ≤100% $OD_B$, such as ≤95% $OD_B$, or ≤90% $OD_B$. It can be appreciated that $L_{BP}$ can be within a range between and including any of the % $OD_B$ values described herein.

For example, $L_{BP}$ can be ≥60% $OD_B$ and ≤100% $OD_B$, such as ≥60% $OD_B$ and ≤95% $OD_B$, or ≥60% $OD_B$ and ≤90% $OD_B$. $L_{BP}$ can be ≥65% $OD_B$ and ≤100% $OD_B$, such as ≥65% $OD_B$ and ≤95% $OD_B$, or ≥65% $OD_B$ and ≤90% $OD_B$. $L_{BP}$ can be ≥70% $OD_B$ and ≤100% $OD_B$, such as ≥70% $OD_B$ and ≤95% $OD_B$, or ≥70% $OD_B$ and ≤90% $OD_B$. $L_{BP}$ can be ≥75% $OD_B$ and ≤100% $OD_B$, such as ≥75% $OD_B$ and ≤95% $OD_B$, or ≥75% $OD_B$ and ≤90% $OD_B$. Further, $L_{BP}$ can be ≥80% $OD_B$ and ≤100% $OD_B$, such as ≥80% $OD_B$ and ≤95% $OD_B$, or ≥80% $OD_B$ and ≤90% $OD_B$.

In a particular aspect, $W_{BP}$ can be ≤25% $OD_B$, such as ≤20% $OD_B$, or ≤15%. Moreover, $W_{BP}$ can be ≥5% $OD_B$, such as ≥10%, or ≥12.5%. It can be appreciated that $W_{BP}$ can be within a range between and including any of the 25% $OD_B$ values described herein.

For example, $W_{BP}$ can be ≤25% $OD_B$ and ≥5% $OD_B$, such as ≤25% $OD_B$ and ≥10% $OD_B$, or ≤25% $OD_B$ and ≥12.5% $OD_B$. $W_{BP}$ can be ≤20% $OD_B$ and ≥5% $OD_B$, such as ≤20% $OD_B$ and ≥10% $OD_B$, or ≤20% $OD_B$ and ≥12.5% $OD_B$. $W_{BP}$ can be ≤15% $OD_B$ and ≥5% $OD_B$, such as ≤15% $OD_B$ and ≥10% $OD_B$, or ≤15% $OD_B$ and ≥12.5% $OD_B$.

In another aspect, each bearing pad 530, 532 can include an overall height, $H_{BP}$, and $H_{BP}$ can be ≤75% $W_{BP}$, such as ≤70% $W_{BP}$, ≤65% $W_{BP}$, ≤60% $W_{BP}$, ≤55% $W_{BP}$, or ≤50% $W_{BP}$. $H_{BP}$ can be ≥10% $W_{BP}$, such as ≥15% $W_{BP}$, ≥20% $W_{BP}$, or ≥25% $W_{BP}$. It can be appreciated that $H_{BP}$ can be within a range between and including any of the % $W_{BP}$ values described herein.

For example, $H_{BP}$ can be ≤75% $W_{BP}$ and ≥10% $W_{BP}$, such as ≤75% $W_{BP}$ and ≥15% $W_{BP}$, ≤75% $W_{BP}$ and ≥20% $W_{BP}$, or ≤75% $W_{BP}$ and ≥25% $W_{BP}$. $H_{BP}$ can be ≤70% $W_{BP}$ and ≥10% $W_{BP}$, such as ≤70% $W_{BP}$ and ≥15% $W_{BP}$, ≤70% $W_{BP}$ and ≥20% $W_{BP}$, or ≤05% $W_{BP}$ and ≥25% $W_{BP}$. $H_{BP}$ can be ≤65% $W_{BP}$ and ≥10% $W_{BP}$, such as ≤65% $W_{BP}$ and ≥15% $W_{BP}$, ≤65% $W_{BP}$ and ≥20% $W_{BP}$, or ≤65% $W_{BP}$ and ≥25% $W_{BP}$. $H_{BP}$ can be ≤60% $W_{BP}$ and ≥10% $W_{BP}$, such as ≤60% $W_{BP}$ and ≥15% $W_{BP}$, ≤60% $W_{BP}$ and ≥20% $W_{BP}$, or ≤60% $W_{BP}$ and ≥25% $W_{BP}$. $H_{BP}$ can be ≤55% $W_{BP}$ and ≥10% $W_{BP}$, such as ≤55% $W_{BP}$ and ≥15% $W_{BP}$, ≤55% $W_{BP}$ and ≥20% $W_{BP}$, or ≤55% $W_{BP}$ and ≥25% $W_{BP}$. Moreover, $H_{BP}$ can be ≤50% $W_{BP}$ and ≥10% $W_{BP}$, such as ≤50% $W_{BP}$ and ≥15% $W_{BP}$, ≤50% $W_{BP}$ and ≥20% $W_{BP}$, or ≤50% $W_{BP}$ and ≥25% $W_{BP}$.

As illustrated in FIG. 5 through FIG. 7, each bearing pad 530, 532 can include a shaft contact surface 540, 542. In particular bearing pad 530, 532 can include a single, continuous shaft contact surface 540, 542. Each shaft contact surface 540, 542 can include a radius of curvature, $R_{SCS}$, and $R_{SCS}$ can be ≥2×$R_{CS}$, such as ≥5×$R_{CS}$, ≥10×$R_{CS}$, ≥50×$R_{CS}$, ≥100×$R_{CS}$, or ≥1000×$R_{CS}$. Further, $R_{SCS}$ can be ≤infinity. It can be appreciated that $R_{SCS}$ can be within a range between and including any of the values for $R_{SCS}$ values described herein.

For example, $R_{SCS}$ can be ≥2×$R_{CS}$ and ≤infinity, such as ≥5×$R_{CS}$ and ≤infinity, ≥10×$R_{CS}$ and ≤infinity, ≥50×$R_{CS}$ and ≤infinity, ≥100×$R_{CS}$ and ≤infinity, or ≥1000×$R_{CS}$ and ≤infinity.

As $R_{SCS}$ approaches infinity, each shaft contact surface 540, 542 can be considered flat or substantially planar. In this aspect, each shaft contact surface 540, 542 can include a flatness, F. In a particular aspect, F can be ≤±0.001 in, such as ≤±0.00075 in, ±0.0005 in, ±0.00025 in, or ≤±0.0001 in. Further, F can be ≥±0.00001 in, such as ≥±0.000025 in, ≥±0.00005 in, or ≥±0.000075 in. It can be appreciated that F can be within a range between and including any of the values of F described herein.

For example, F can be ≤±0.001 in and ≥±0.00001 in, such as ≤±0.001 in and ≥±0.000025 in, ≤±0.001 in and ≥±0.00005 in, or ≤±0.001 in and ≥±0.000075 in. F can be ≤±0.00075 in and ≥±0.00001 in, such as ≤±0.00075 in and ≥±0.000025 in, ≤±0.00075 in and ≥±0.00005 in, or ≤±0.00075 in and ≥±0.000075 in. F can be ≤±0.0005 in and ≥±0.00001 in, such as ≤±0.0005 in and ≥±0.000025 in, ≤±0.0005 in and ≥±0.00005 in, or ≤±0.0005 in and ≥±0.000075 in. F can be ≤±0.00025 in and ≥±0.00001 in, such as ≤±0.00025 in and ≥±0.000025 in, ≤±0.00025 in and ≥±0.00005 in, or ≤±0.00025 in and ≥±0.000075 in. F can be ≤±0.0001 in and ≥±0.00001 in, such as ≤±0.0001 in and ≥±0.000025 in, ≤±0.0001 in and ≥±0.00005 in, or ≤±0.0001 in and ≥±0.000075 in.

In particular, each bearing pad 530, 532 can be embedded within the body 502 such the shaft contact surface 540, 542 of each bearing pad 530, 532 can be spaced a distance, $D_S$, from the concave surface 510 of the body 502 as measured along a long side of each bearing pad 530, 532.

In a particular aspect, $D_S$ can be ≥5% $H_{BP}$, such as ≥7.5% $H_{BP}$, ≥10% $H_{BP}$, ≥12.5% $H_{BP}$, ≥15% $H_{BP}$, ≥17.5% $H_{BP}$, or ≥20% $H_{BP}$. Further, $D_S$ can be ≤50% $H_{BP}$, such as ≤45% $H_{BP}$, ≤40% $H_{BP}$, ≤35% $H_{BP}$, or ≤30% $H_{BP}$. $D_S$ can be within a range between and including any of the % $H_{BP}$ values described herein.

For example, $D_S$ can be ≥5% $H_{BP}$ and ≤50% $H_{BP}$, such as ≥5% $H_{BP}$ and ≤45% $H_{BP}$, ≥5% $H_{BP}$ and ≤40% $H_{BP}$, ≥5% $H_{BP}$ and ≤35% $H_{BP}$, or ≥5% $H_{BP}$ and ≤30% $H_{BP}$. $D_S$ can be ≥7.5% $H_{BP}$ and ≤50% $H_{BP}$, such as ≥7.5% $H_{BP}$ and ≤45% $H_{BP}$, ≥7.5% $H_{BP}$ and ≤40% $H_{BP}$, ≥7.5% $H_{BP}$ and ≤35% $H_{BP}$, or ≥7.5% $H_{BP}$ and ≤30% $H_{BP}$. $D_S$ can be ≥10% $H_{BP}$ and ≤50% $H_{BP}$, such as ≥10% $H_{BP}$ and ≤45% $H_{BP}$, ≥10% $H_{BP}$ and ≤40% $H_{BP}$, ≥10% $H_{BP}$ and ≤35% $H_{BP}$, or ≥10% $H_{BP}$ and ≤30% $H_{BP}$. $D_S$ can be ≥12.5% $H_{BP}$ and ≤50% $H_{BP}$, such as ≥12.5% $H_{BP}$ and ≤45% $H_{BP}$, ≥12.5% $H_{BP}$ and ≤40% $H_{BP}$, ≥12.5% $H_{BP}$ and ≤35% $H_{BP}$, or ≥12.5% $H_{BP}$ and ≤30% $H_{BP}$. $D_S$ can be ≥15% $H_{BP}$ and ≤50% $H_{BP}$, such as ≥15% $H_{BP}$ and ≤45% $H_{BP}$, ≥15% $H_{BP}$ and ≤40% $H_{BP}$, ≥15% $H_{BP}$ and ≤35% $H_{BP}$, or ≥15% $H_{BP}$ and ≤30% $H_{BP}$. $D_S$ can be ≥17.5% $H_{BP}$ and ≤50% $H_{BP}$, such as ≥17.5% $H_{BP}$ and ≤45% $H_{BP}$, ≥17.5% $H_{BP}$ and ≤40% $H_{BP}$, ≥17.5% $H_{BP}$ and ≤35% $H_{BP}$, or ≥17.5% $H_{BP}$ and ≤30% $H_{BP}$. $D_S$ can be ≥20% $H_{BP}$ and ≤50% $H_{BP}$, such as ≥20% $H_{BP}$ and ≤45% $H_{BP}$, ≥20% $H_{BP}$ and ≤40% $H_{BP}$, ≥20% $H_{BP}$ and ≤35% $H_{BP}$, or ≥20% $H_{BP}$ and ≤30% $H_{BP}$.

As shown in FIG. 7, each shaft contact surface 540, 542 can be angled with respect to the central axis 524 at an angle, A. A is ≥5°, such as ≥7.5°, or ≥10°. In another aspect, A is ≤60°, such as ≤55°, ≤50°, or ≤45°. It can be appreciated that A can be within a range between and including any of the values for A described herein.

For example, A can be ≥5° and ≤60°, such as ≥5° and ≤55°, ≥5° and ≤50°, or ≥5° and ≤45°. A can be ≥7.5° and ≤60°, such as ≥7.5° and ≤55°, ≥7.5° and ≤50°, or ≥7.5° and ≤45°. A can be ≥10° and ≤60°, such as ≥10° and ≤55°, ≥10° and ≤50°, or ≥10° and ≤45°.

In a particular aspect as illustrated in FIG. 6 and FIG. 7, each bearing pad 530, 532 can include a base 550 that can include a first shoulder 552 and a second shoulder 554. A shaft support structure 556 can extend from the base 550 between the shoulders 552, 554 of the base 550.

Each shaft support structure 556 can include an embedded portion 560 that is embedded within the body 502 and an exposed portion 562 that extends from the concave surface 510 of the body 502 to a distance, $D_E$, from the concave surface 510 measured along a long side, or edge, or the bearing pad 530, 532. Each shaft support structure 556 can include a height, $H_S$, measured from the shoulders 552, 554 of the base 550 to a distal end 564 of the shaft support structure 556.

In a particular aspect, $D_E$ can be ≤50% $H_S$, such as ≤45% $H_S$, ≤40% $H_S$, ≤35% $H_S$, ≤30% $H_S$, or ≤25% $H_S$. Moreover, $D_E$ can be ≥5% $H_S$, such as ≥10% $H_S$, ≥15% $H_S$, or ≥20% $H_S$. It can be appreciated that $D_E$ can be within a range of any of the % $H_S$ values described herein.

For example, $D_E$ can be ≤50% $H_S$ and ≥5% $H_S$, such as ≤50% $H_S$ and ≥10% $H_S$, ≤50% $H_S$ and ≥15% $H_S$, or ≤50% $H_S$ and ≥20% $H_S$. $D_E$ can be ≤45% $H_S$ and ≥5% $H_S$, such as ≤45% $H_S$ and ≥10% $H_S$, ≤45% $H_S$ and ≥15% $H_S$, or ≤45% $H_S$ and ≥20% $H_S$. $D_E$ can be ≤40% $H_S$ and ≥5% $H_S$, such as ≤40% $H_S$ and ≥10% $H_S$, ≤40% $H_S$ and ≥15% $H_S$, or ≤40% $H_S$ and ≥20% $H_S$. $D_E$ can be ≤35% $H_S$ and ≥5% $H_S$, such as ≤35% $H_S$ and ≥10% $H_S$, ≤35% $H_S$ and ≥15% $H_S$, or ≤35% $H_S$ and ≥20% $H_S$. $D_E$ can be ≤30% $H_S$ and ≥5% $H_S$, such as ≤30% $H_S$ and ≥10% $H_S$, ≤30% $H_S$ and ≥15% $H_S$, or ≤30% $H_S$ and ≥20% $H_S$. Moreover, $D_E$ can be ≤25% $H_S$ and ≥5% $H_S$, such as ≤25% $H_S$ and ≥10% $H_S$, ≤25% $H_S$ and ≥15% $H_S$, or ≤25% $H_S$ and ≥20% $H_S$.

The base 550 of each bearing pad 530, 532 can include an overall width, $W_B$, and the shaft support structure of each bearing pad comprises an overall width, $W_S$. $W_S$ can be ≤90% $W_B$, such as ≤85% $W_B$, ≤80% $W_B$, or ≤75% $W_B$. Further, $W_S$ can be ≥50% $W_B$, such as ≥55% $W_B$, ≥60% $W_B$, or ≥65% $W_B$. It can be appreciated that $W_S$ can be within a range between and including any of the % $W_B$ values described herein.

For example, $W_S$ can be ≤90% $W_B$ and ≥50% $W_B$, such as ≤90% $W_B$ and ≥55% $W_B$, ≤90% $W_B$ and ≥60% $W_B$, or ≤90% $W_B$ and ≥65% $W_B$. $W_S$ can be ≤85% $W_B$ and ≥50% $W_B$, such as ≤85% $W_B$ and ≥55% $W_B$, ≤85% $W_B$ and ≥60% $W_B$, or ≤85% $W_B$ and ≥65% $W_B$. $W_S$ can be ≤80% $W_B$ and ≥50% $W_B$, such as ≤80% $W_B$ and ≥55% $W_B$, ≤80% $W_B$ and ≥60% $W_B$, or ≤80% $W_B$ and ≥65% $W_B$. $W_S$ can be ≤75% $W_B$ and ≥50% $W_B$, such as ≤75% $W_B$ and ≥55% $W_B$, ≤75% $W_B$ and ≥60% $W_B$, or ≤75% $W_B$ and ≥65% $W_B$.

As illustrated in FIG. 6 and FIG. 7, the steering yoke assembly 500 can further include a spring pocket 570 (i.e., a bore) formed in, or otherwise extending into, the flat surface 508 of the first end 504 of the body 502. The spring pocket 570 can include a depth, $D_S$, and the body 502 can include an overall height, $H_B$. $D_S$ can be ≥10% $H_B$, such as ≥15% $H_B$, ≥20% $H_B$, or ≥25% $H_B$. Further, $D_S$ can be ≤50% $H_B$, such as ≤45% $H_B$, ≤40% $H_B$, ≤35% $H_B$, or ≤30% $H_B$. The spring pocket 570 can include a guide portion 572 at the opening of the spring pocket 570. The guide portion 572 can be established by an angled surface extending between a straight inner wall of the spring pocket 570 and the flat surface 508 at the first end 504 of the body 502.

In another aspect, the steering yoke assembly 500 can include a third bearing pad (not shown) embedded into the concave surface 510 of the body 502 along the central axis 524 of the body 502. The third bearing pad can span the first lateral side 520 of the concave surface 510 and the second lateral side 522 of the concave surface 510 so that the third bearing pad is centered on the central axis 524. Further, the third bearing pad and the shaft contact surface of the third bearing pad can be substantially perpendicular to the central axis 524 of the body 502.

Moreover, the steering yoke assembly 500 can include a low friction coating on the outer wall of the body 502. In a particular aspect, the low friction coating can be PTFE. The low friction coating can allow the steering yoke assembly 500 to be easily installed within a bore.

With the configuration of structure described herein, the steering yoke assemblies 300, 500 provide lower contact between a rack shaft and the steering yoke assembly. Limiting the contact between those parts can reduce the precision required to make the steering yoke assembly. Specifically, the precision required to make and place the bearing pads in, or on, the body of the steering yoke assembly is substantially lower than the precision required to shape or machine a typical curved contact surface.

Moreover, limiting the contact area to only the bearing pads can lead to a self-centering steering yoke assembly. In other words, if one or both of the bearing pads are slightly misaligned, the rack shaft can relatively quickly wear a portion of a misaligned bearing pad until that pad properly fits against the rack shaft.

While the bearing pads described herein can include a shaft contact surface, it can be appreciated that the shaft contact surface can be rounded. Further, the shaft contact surface can include two adjacent surfaces that meet at an apex along the length of the bearing pad so that shape of the shaft contact surface can be generally triangle when viewed from a short end of the bearing pad.

A skilled artisan can recognize that there may be others applications that can utilize a tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:
1. A steering yoke bearing assembly comprising:
   a body comprising:
      a first end having a flat surface;
      a second end opposite the first end, the second end having a concave surface having a radius of curvature, $R_{CS}$, a first lateral side and a second lateral side opposite the first lateral side;
      a first bearing pad extending from the first lateral side of the concave surface;
      a second bearing pad extending from the second lateral side of the concave surface opposite the first bearing pad; and
      a third bearing pad disposed between the first and second bearing pads, wherein at least one of the first and second bearing pads includes a shaft contact surface having a radius of curvature, $R_{SCS}$, and $R_{SCS} \geq 2 \times R_{CS}$.

2. The assembly according to claim 1, wherein the concave surface of the body comprises a first bearing pad pocket that extends into the first lateral side of the concave surface and a second bearing pad pocket that extends into the second lateral side of the concave surface opposite the first bearing pad pocket, wherein the first bearing pad fits into the first bearing pad pocket and the second bearing pad fits into the second bearing pad pocket.

3. The assembly according to claim 1, wherein each of the fire and second bearing pads comprises a polymer.

4. The assembly according to claim 1, wherein the first and second bearing pads are affixed to the concave surface of the body.

5. The assembly according to claim 4, wherein the first and second bearing pads each comprises a body contact surface opposite the shaft contact surface and the body contact surface is curved to match the curvature of the concave surface of the body.

6. The assembly according to claim 1, wherein each of the first and second bearing pad comprises:
a base having a first shoulder and a second shoulder; and
a shaft support structure extending from the base between the shoulders, wherein the base of each of the bearing pads is embedded within the concave surface of the body and the shaft support structure extends from the concave surface of the body.

7. The assembly according to claim 6, wherein each of the shaft support structures comprises an embedded portion that is embedded within the body and an exposed portion that extends from the concave surface of the body at a distance, $D_E$, wherein each of the shaft support structures comprises an overall height, $H_S$, measured from the shoulders of the base, and wherein $D_E \leq 50\% \ H_S$.

8. The assembly according to claim 1, wherein the third bearing pad spans the first lateral side of the concave surface and the second lateral side of the concave surface.

9. The assembly according to claim 8, wherein the third bearing pad is substantially perpendicular to the central axis of the body.

10. A steering yoke bearing assembly comprising:
a body comprising:
a first end having a flat surface;
a second end opposite the first end, the second end having a concave surface having a first lateral side and a second lateral side opposite the first lateral side;
a first bearing pad having an interlocking arrangement with the body in the first lateral side of the concave surface; and
a second bearing pad having an interlocking arrangement with the body in the second lateral side of the concave surface,
wherein each of the bearing pads includes a base embedded below the concave surface and a shaft support structure extending from the base through the concave surface.

11. The assembly according to claim 10, wherein each of the shaft support structures comprises an embedded portion that is embedded within the body and an exposed portion that extends from the concave surface of the body to a distance, $D_E$, wherein each of the shaft support structures comprises a height, $H_S$, measured from the shoulders of the base to a distal end of the shaft support structure, and wherein $D_E \leq 50\% \ H_S$.

12. The assembly according to claim 10, wherein each of the bearing pads includes a shaft contact surface that is substantially planar.

13. The assembly according to claim 10, wherein the body includes an outer diameter, $OD_B$, and each of the bearing pads includes a width, $W_{BP}$, and $W_{BP} \leq 25\% \ OD_B$.

14. The assembly according to claim 10, wherein each of the bearing pads comprises a single, continuous shaft contact surface.

15. The assembly according to claim 10, wherein each of the bearing pads comprises an overall height, $H_{BP}$, and a width, $W_{BP}$, and $H_{BP} \leq 75\% \ W_{BP}$.

16. The assembly according to claim 10, wherein each of the bearing pads comprises an overall height, $H_{BP}$, and each of the bearing pads is embedded in the concave surface at a depth, $D$, and $D \geq 1\% \ H_{BP}$.

17. The assembly according to claim 10, wherein each of the bearing pads comprises a shaft contact surface, wherein each of the shaft contact surfaces is angled with respect to a central axis at an angle, A, wherein A is $\geq 5°$, and wherein A is $\leq 60°$.

18. The assembly according to claim 10, further comprising a third bearing pad disposed between the first bearing pad and the second bearing pad.

19. A steering assembly comprising:
a pinion housing formed with a bore;
a steering shaft adjacent to the pinion housing;
a steering yoke bearing assembly installed within the bore of the pinion housing such that it contacts an outer surface of the steering shaft, the steering yoke bearing assembly comprising:
a body comprising:
a first end having a flat surface;
a second end opposite the first end, the second end having a concave surface that defines a first lateral side and a second lateral side opposite the first lateral side;
a first bearing pad embedded within the concave surface of the body; and
a second bearing pad embedded within the concave surface of the body, wherein each of the bearing pads includes a base having a first shoulder and a second shoulder and a shaft support structure extending from the base between the shoulders of the base.

20. The assembly according to claim 19, further comprising a third bearing pad disposed between the first bearing pad and the second bearing pad.

* * * * *